UNITED STATES PATENT OFFICE.

JULES WEIRICH, OF BÉZIERS, HÉRAULT, FRANCE.

PROCESS OF SEPARATING PRECIOUS METALS FROM ORES.

SPECIFICATION forming part of Letters Patent No. 404,328, dated May 28, 1889.

Application filed May 10, 1888. Serial No. 273,492. (No specimens.) Patented in France March 20, 1888, No. 176,471.

*To all whom it may concern:*

Be it known that I, JULES WEIRICH, a citizen of the Republic of France, residing at Béziers, Department of Hérault, have invented certain new and useful Improvements in the Process of Separating Precious Metals from Ores, (for which I have received Letters Patent in France March 20, 1888, No. 176,471;) and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

The invention relates to the treatment of auriferous and argentiferous ores whether of a silicious or non-silicious nature.

It is well known that silicious ores—such as auriferous mispickel and other ores containing more or less silica, as well as ores devoid of any great percentage of silica, cannot be successfully treated by the ordinary processes of amalgamation.

This invention has for its object to prepare this class of ores, or ores poor in precious metals, so as to fit them for the process of amalgamation at a comparatively small expense.

I have found that by combining with the ore substances that will form a soluble silicate, (water-glass,) or by adding to the ore in which a sufficient amount of silica is present a salt of the alkalies to form a soluble silicate with the silica when subjected to sufficient heat, said silicate will combine with the oxides of the baser metals or metalloids present as well as with sulphur, arsenic, &c., the gangue thus setting the precious metal free, so that it will readily amalgamate.

To these ends the invention consists in a novel mode or process of treating auriferous or argentiferous ores to prepare them for the process of amalgamation, substantially as hereinafter described, and set forth in the claim.

In carrying out my process I first roast the ore to oxidize the baser metals, and if the ore is of a silicious nature I mix therewith a salt of the alkalies that will combine with the silica and form a soluble silicate (or water-glass) and finally melt the compound to form the soluble silicate. The matte or product of fusion is then ground or otherwise reduced to a pulverulent condition, and the precious metal obtained therefrom by the ordinary process of amalgamation. It will be noticed that the melting of the roasted ore is not here resorted to for the purpose of obtaining the metal in the form of a regulus, but simply to free the precious metal from the baser metallic constituents of the ore and the gangue, so as to bring it into a condition where it will readily amalgamate.

In practice, and with a view to economy in expenditures, I preferably use carbonate of soda, which also has the advantage of being more readily fused than any other salt of the alkalies, and I use from ten to thirty per centum of the salt. This proportion will vary with the nature of the gangue of the ore and with the proportion of precious metal combined therewith. The greater the proportion of soda the quicker will be the reaction, while less heat is required in fusing; but when the ore is poor in precious metals the cost will be materially increased, and only so much of the salt should be used as is necessary to the proper reaction. Hence, as above stated, the proportion of soda will vary materially with different ores; but in no case should this proportion be less than from eight to ten per centum; otherwise the formation of the soda water-glass, or silicate of soda, resulting from the combination of the salt of the alkalies with the silica in the ore and with the metals converted into oxides by the process of roasting, and whereby the precious metals are set free, could not be effected except under very high temperatures, difficult to obtain in practice. Charcoal may be added to the roasted compound before fusing or melting, in the proportion of from 0.4 to 0.8 per centum, according to the nature of the ore, to assist in the reduction of the undesirable metals and metalloids into oxides and the liberating of the precious metals. Where the ore is deficient in silica this deficiency may be made up by the addition of silica in the form of quartz and in sufficient quantity to produce the reaction with the salt of the alkalies to form silicate of soda.

Whatever may be the composition of the silicate of soda formed the precious metals combined with the ore will be freed from their combinations—such as sulphur, arsenic, antimony, and similar substances.

Any suitable furnace—such as is used in the manufacture of soda—may be employed in carrying out my process, and if carefully carried out the losses in precious metals will be almost inappreciable.

Having described my invention, I claim—

The herein-described process of separating precious metals from auriferous or auro-argentiferous minerals, which consists, first, in freeing the mineral from sulphur, arsenic, antimony, &c., and oxidizing the base metals with which the precious metals are combined by heat; secondly, mixing with the mineral so prepared, in or about in the proportions set forth, a salt of the alkalies and silica, (when the mineral is deficient in silica;) third, converting the oxides of the base metals into silicates by fusion, and, lastly, separating the precious metals from the silicates by amalgamation, said silicates being previously pulverized.

In testimony whereof I affix my signature in presence of two witnesses.

JULES WEIRICH.

Witnesses:
BARCONDA,
A. LAVAL.